(12) United States Patent
Yoon et al.

(10) Patent No.: US 9,319,094 B2
(45) Date of Patent: Apr. 19, 2016

(54) WIRELESS TRANSCEIVER WITH CIRCULATOR AND ACTIVE CANCELLATION AND METHODS FOR USE THEREWITH

(71) Applicant: BROADCOM CORPORATION, Irvine, CA (US)

(72) Inventors: Seunghwan Yoon, Irvine, CA (US); Ahmadreza Rofougaran, Newport Coast, CA (US); Alireza Tarighat Mehrabani, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 200 days.

(21) Appl. No.: 14/105,531

(22) Filed: Dec. 13, 2013

(65) Prior Publication Data

US 2015/0146583 A1 May 28, 2015

Related U.S. Application Data

(60) Provisional application No. 61/909,792, filed on Nov. 27, 2013.

(51) Int. Cl.
*H04B 1/52* (2015.01)
*H04B 1/04* (2006.01)
*H04B 1/525* (2015.01)
*H04B 1/18* (2006.01)

(52) U.S. Cl.
CPC .............. *H04B 1/525* (2013.01); *H04B 1/0458* (2013.01); *H04B 1/18* (2013.01)

(58) Field of Classification Search
None
See application file for complete search history.

(56) References Cited

U.S. PATENT DOCUMENTS

| | | | | |
|---|---|---|---|---|
| 6,255,912 B1* | 7/2001 | Laub | ................... | H03C 3/0966 331/25 |
| 6,819,720 B1* | 11/2004 | Willetts | ................ | H03F 1/3247 330/149 |
| 7,061,877 B1* | 6/2006 | Gummalla | ............. | H04B 1/525 370/278 |
| 8,781,049 B1* | 7/2014 | Belitzer | .................... | H03L 7/08 375/224 |
| 8,805,298 B2* | 8/2014 | McCallister | ........... | H04B 1/525 375/219 |
| 2008/0107093 A1* | 5/2008 | Meiyappan | ............ | H04B 1/525 370/339 |
| 2014/0220908 A1* | 8/2014 | Loh | ........................ | H04B 1/525 455/78 |
| 2014/0269991 A1* | 9/2014 | Aparin | .................. | H04B 1/0475 375/297 |

* cited by examiner

*Primary Examiner* — Eunsook Choi
(74) *Attorney, Agent, or Firm* — Garlick & Markison; Bruce E. Stuckman

(57) ABSTRACT

A wireless transceiver includes a transmit path configured to generate a radio frequency (RF) transmit signal for transmission via an antenna, the transmit path generating a feedforward signal having at least one adjustable phase. A receive path is configured to receive an RF receive signal via the antenna. A circulator-based duplexer includes a circulator configured to couple the transmit signal from the transmit path to the antenna and to couple the receive signal from the antenna to the receive path. A controller is configured to process feedback from the receive path and to control the at least one adjustable phase to cancel portions of the transmit signal on the receive path.

20 Claims, 8 Drawing Sheets

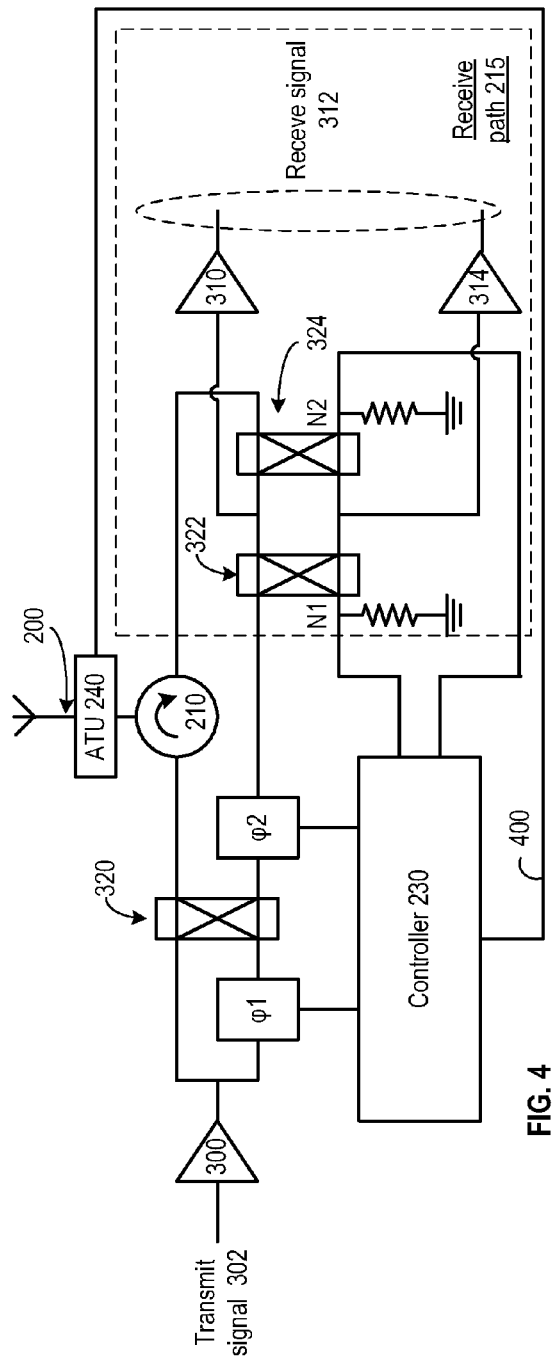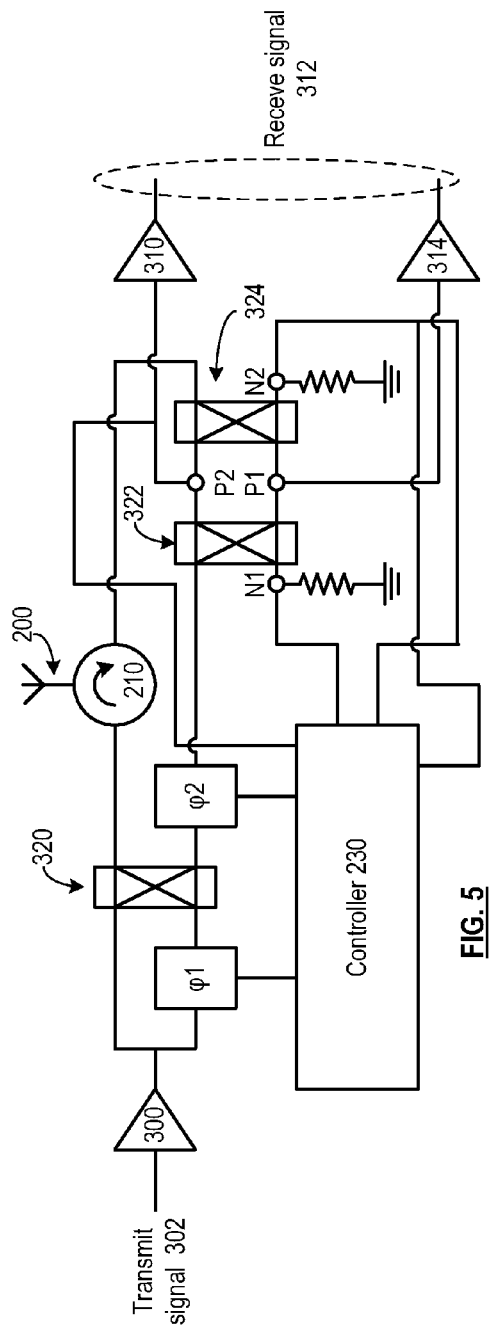
FIG. 4
FIG. 5

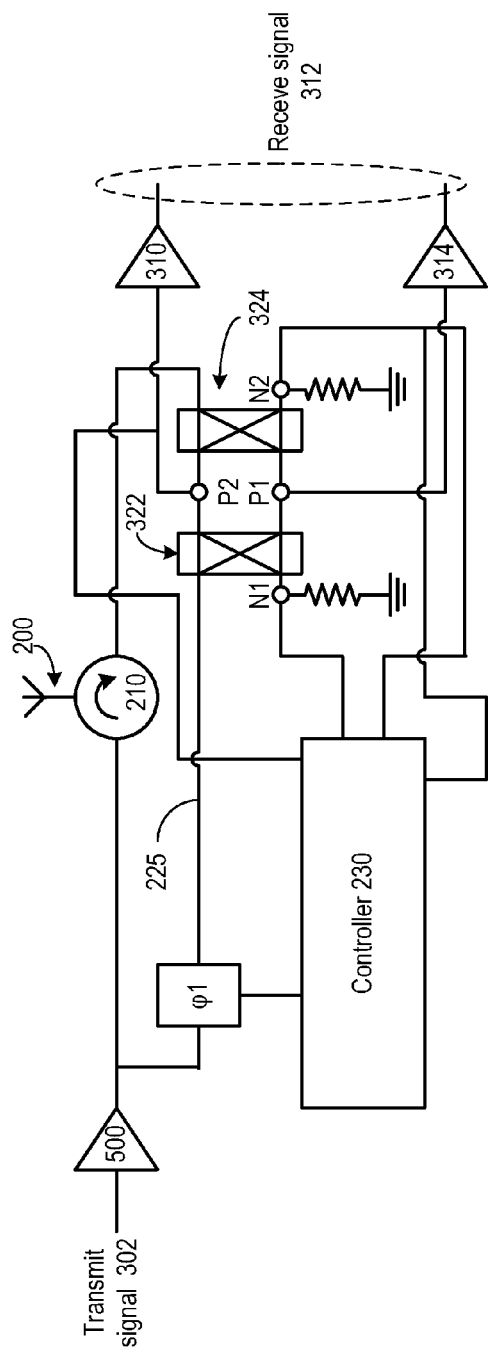
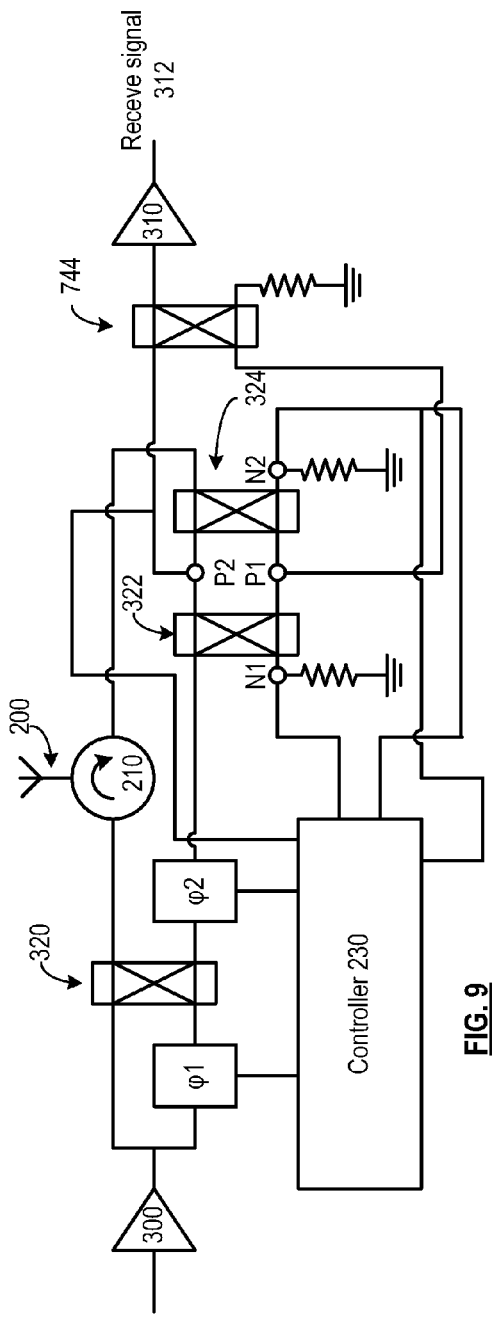
FIG. 8
FIG. 9

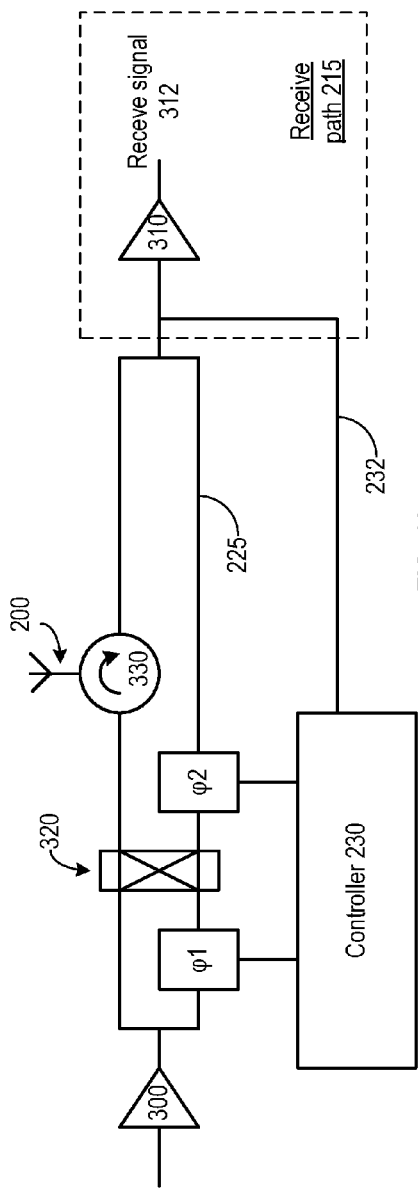
FIG. 10
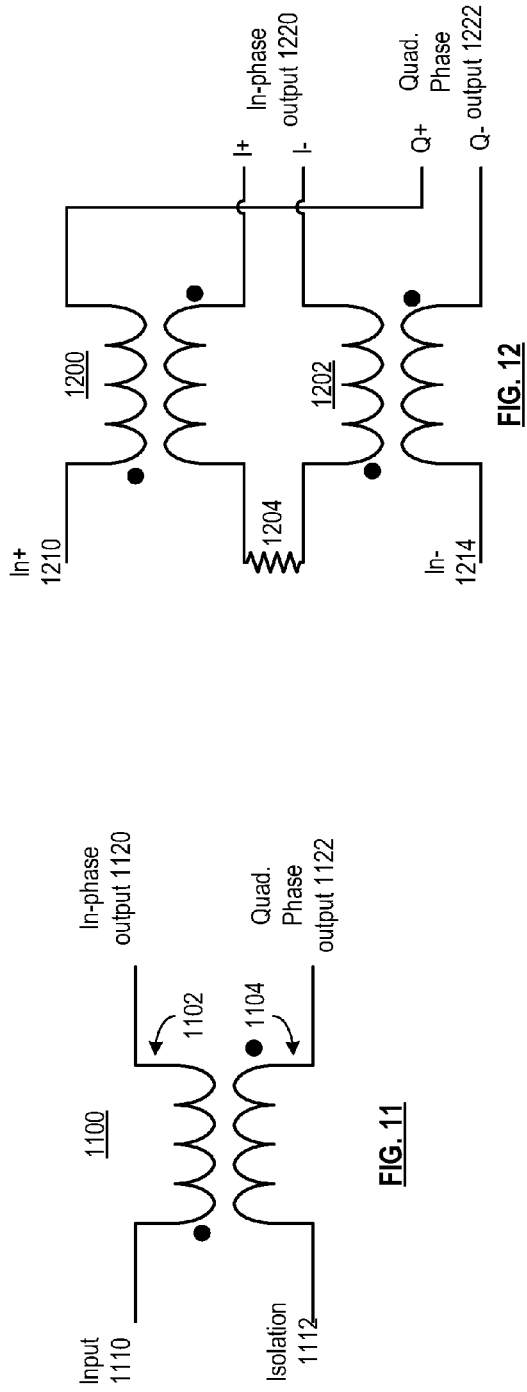
FIG. 11
FIG. 12

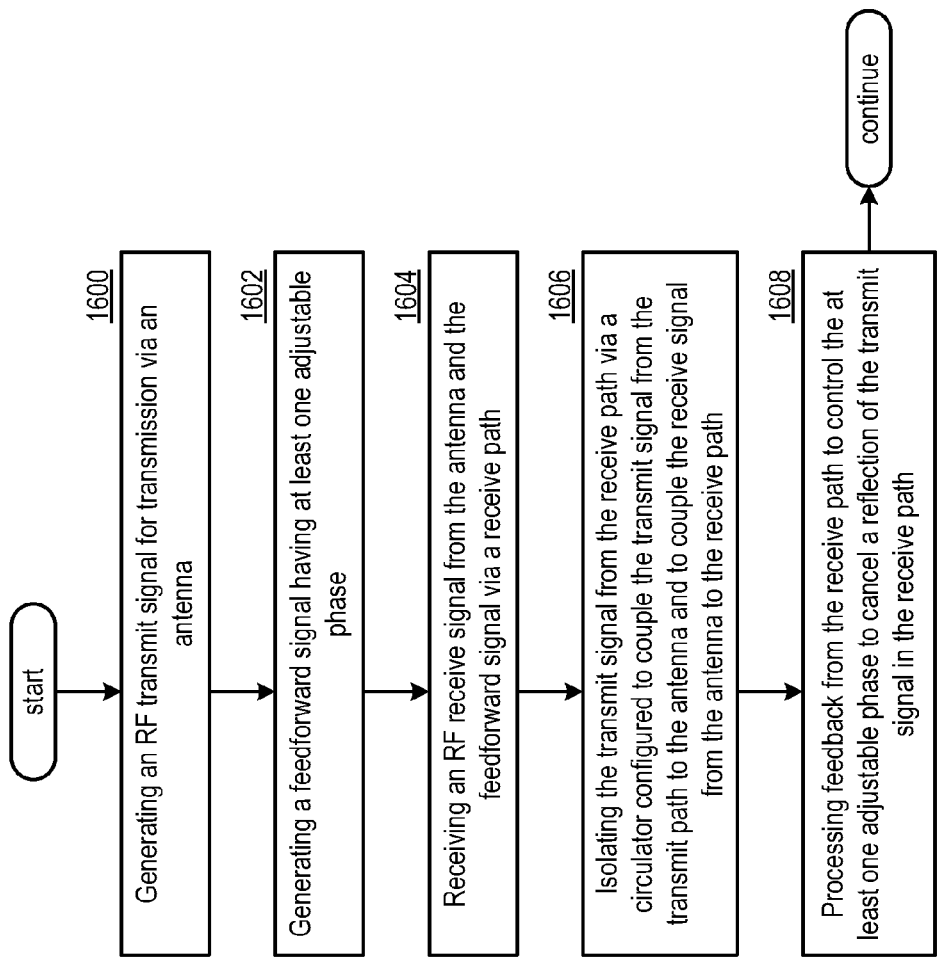

US 9,319,094 B2

WIRELESS TRANSCEIVER WITH CIRCULATOR AND ACTIVE CANCELLATION AND METHODS FOR USE THEREWITH

CROSS-REFERENCE TO RELATED APPLICATIONS

This application claims priority under 35 U.S.C. 119 to the provisionally filed application entitled, HIGH ISOLATION RADIO FRONT END AND APPLICATIONS THEREOF, having application Ser. No. 61/909,792 and filed on Nov. 27, 2013, the contents of which are incorporated herein by reference for any and all purposes.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND

1. Technical Field

This disclosure relates generally to wireless communication systems and to wireless communication devices that operate therewith.

2. Description of Related Art

In many wireless communication systems, wireless communications occur in a full duplex manner (e.g., transmit and receive on the same frequency) or a near full duplex manner (e.g., transmit and receive on different, but very close, frequencies). In addition, many of the systems utilize multiple frequency bands to support the wireless communications. As such, a wireless communication device operating in a full, or near full, duplex mode may use multiple frequency bands within a system.

A wireless communication device operating in full, or near full, duplex mode may have the transmitted signal leak (i.e., TX bleed-through) into the receive circuitry of the device via the circuitry within the wireless communication device, which adversely effects processing received signals. One solution to reduce TX bleed-through is to use very narrow band TX filters and duplexers. While this does reduce TX bleed-through, it does so at the cost of multiple TX filters and duplexers (e.g., one set per frequency of use). Further, the power amplifiers in the transmit circuitry of the wireless communication device should be narrow band and linear.

In addition, a wireless communication device operating in full, or near full, duplex mode may have the transmitted signal reflected into the receive circuitry via conditions outside of the wireless communication device, which also adversely effects processing received signals. For example, in a multiple antenna device (e.g., MIMO), cross coupling between the antennas occurs, which reflects the transmitted signal into the receive circuitry. Similar solutions for reducing the TX bleed-through can be used to reduce the adverse effects of TX reflection.

BRIEF DESCRIPTION OF THE SEVERAL VIEWS OF THE DRAWING(S)

FIG. 4 is a schematic block diagram of another embodiment of a radio front end in accordance with the present disclosure;

FIG. 5 is a schematic block diagram of another embodiment of a radio front end in accordance with the present disclosure;

FIG. 8 is a schematic block diagram of another embodiment of a radio front end in accordance with the present disclosure;

FIG. 9 is a schematic block diagram of another embodiment of a radio front end in accordance with the present disclosure;

FIG. 10 is a schematic block diagram of another embodiment of a radio front end in accordance with the present disclosure;

FIG. 11 is a schematic block diagram of an embodiment of a quadrature hybrid in accordance with the present disclosure;

FIG. 12 is a schematic block diagram of another embodiment of a quadrature hybrid in accordance with the present disclosure;

FIG. 16 is a flow diagram of another embodiment of a method in accordance with the present disclosure.

DETAILED DESCRIPTION

Figure 1:
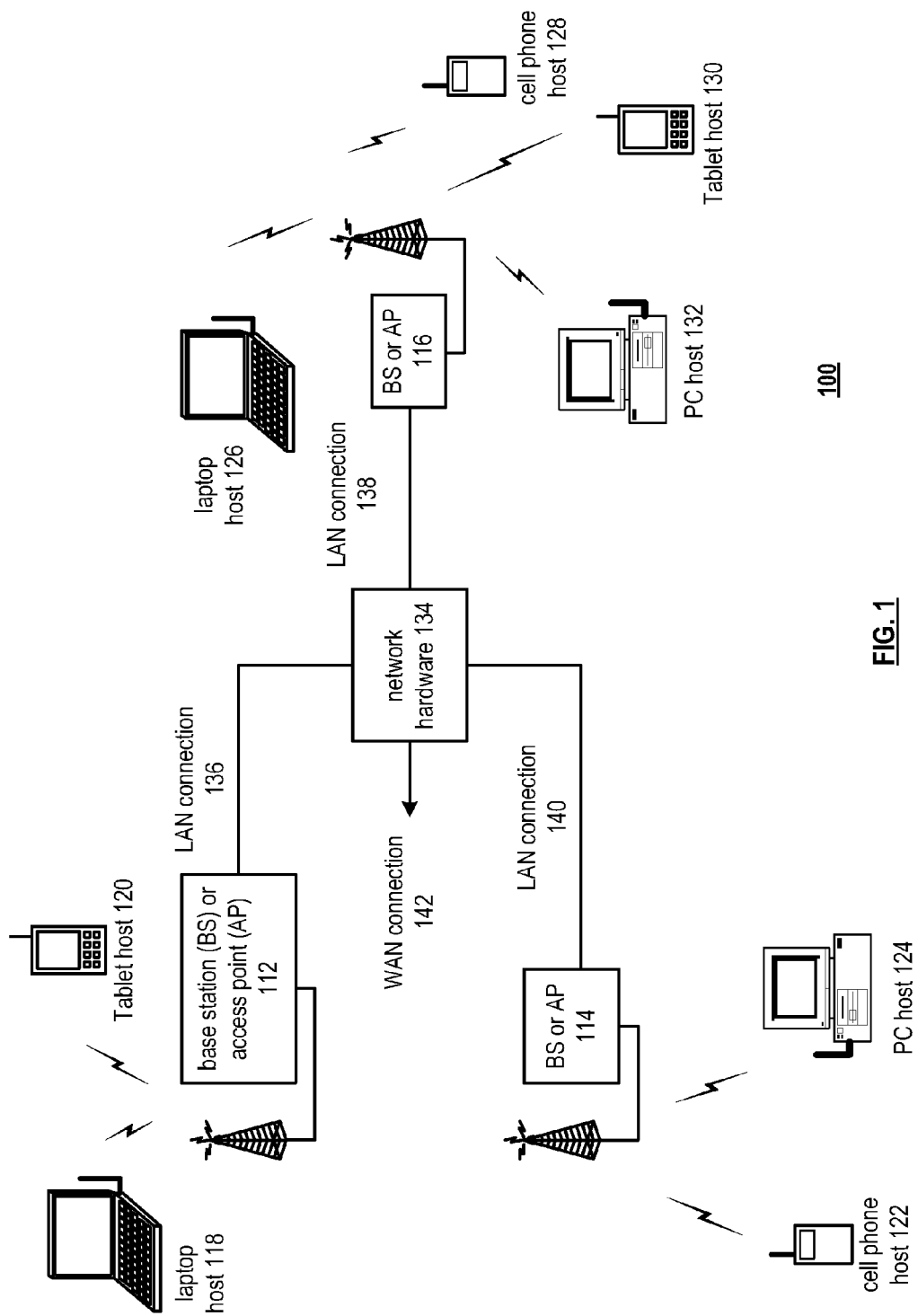
FIG. 1 is a schematic block diagram of an embodiment of a wireless communication system in accordance with the present disclosure.

FIG. 1 is a schematic block diagram of a wireless communication system in accordance with various embodiments. A communication system 100 includes a plurality of base stations and/or access points 112, 114 and 116, a plurality of wireless communication devices 118, 120, 122, 124, 126, 128, 130 and 132 and a network hardware component 134. The wireless communication devices 118, 120, 122, 124, 126, 128, 130 and 132 may be laptop host computers 118 and 126, tablet hosts 120 and 130, personal computer hosts 124 and 132, cellular telephone hosts 122 and 128 and/or other wireless devices.

The base stations or access points 112, 114 and 116 are operably coupled to the network hardware 134 via local area network connections 136, 138 and 140. The network hardware 134, which may be a router, switch, bridge, modem, system controller, etcetera, provides a wide area network connection 142 for the communication system 100. Each of the base stations or access points 112, 114 and 116 has an associated antenna or antenna array to communicate with the wireless communication devices in its area. Typically, the wireless communication devices register with a particular base station or access point 112, 114 or 116 to receive services from the communication system 100. For direct connections (i.e., point-to-point communications), wireless communication devices communicate directly via an allocated channel.

Typically, base stations are used for cellular telephone systems and like-type systems, while access points are used for in-home or in-building wireless local area networks. Regardless of the particular type of communication system, each wireless communication device includes a built-in transceiver and/or is coupled to a transceiver.

In an embodiment, one or more of the communication devices 118, 120, 122, 124, 126, 128, 130 and 132 operates with more than one wireless network. For example, the base stations or access points 112, 114 and 116 could operate in accordance with a wireless local area network protocol such as an 802.11 protocol and one or more wireless communication devices 118, 120, 122, 124, 126, 128, 130 and 132 can be capable of cellular voice and data communications via a protocol such as Enhanced Data rates for GSM Evolution (EDGE), General Packet Radio Service (GPRS), high-speed downlink packet access (HSDPA), high-speed uplink packet access (HSUPA and/or variations thereof) 3GPP (third generation partnership project), LTE (long term evolution), UMTS (Universal Mobile Telecommunications System).

One or more of the wireless communication devices described herein includes a wireless transceiver having circulator-based duplexer and a controller that includes one or more functions and features described in conjunction with FIGS. 2-16.

Figure 2:
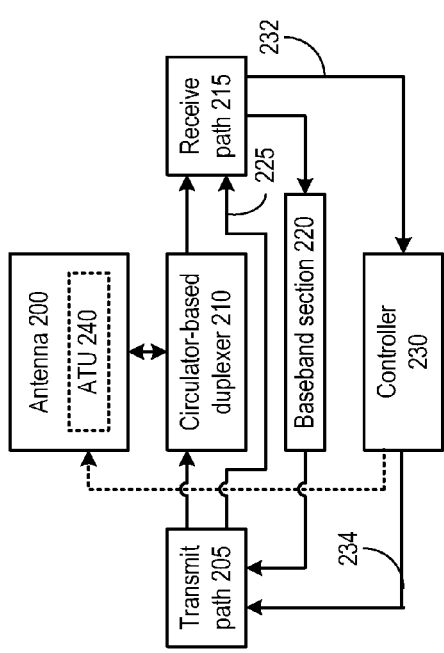
FIG. 2 is a schematic block diagram of an embodiment of a wireless transceiver in accordance with the present disclosure.

FIG. 2 is a schematic block diagram of an embodiment of a wireless transceiver in accordance with the present disclosure. In particular, a wireless transceiver is presented for use in any of the base stations or access points 112, 114 and 116 or the wireless communication devices 118, 120, 122, 124, 126, 128, 130 and 132. The wireless transceiver includes an antenna 200 having an optional antenna tuning unit 240, a transmit path 205, a circulator-based duplexer 210, a receive path 215, a baseband section 220 and a controller 230.

The transmit path 205 is configured to receive a baseband signal or near baseband signal that includes outbound data from the baseband section 220 and to generate a radio frequency (RF) transmit signal that includes the outbound data for transmission via antenna 200.

In an example of operation, the baseband section 220 (e.g., one or more processors) performs one or more functions to transmit outbound data (e.g., voice, text, audio, video, graphics, etc.). The baseband section 220 converts the outbound data into one or more outbound symbol streams in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the baseband section 220 converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and Multiple Input Multiple Output (MIMO) communications.

The baseband section 220 provides the outbound symbol stream(s) to the up conversion circuit of the transmit path 205, which converts the outbound symbol stream(s) into one or more up converted signals (e.g., signals in one or more frequency bands 800 MHz, 1800 MHz, 1900 MHz, 2000 MHz, 2.4 GHz, 5 GHz, 60 GHz, etc.). The up conversion circuit may have a direct conversion topology or a super-heterodyne topology and may include discrete digital components and/or analog circuitry. In addition, the up conversion circuit may receive and process the outbound symbol stream(s) as Cartesian coordinates, as polar coordinates, and/or as hybrid polar-Cartesian coordinates.

A transmit (TX) output circuit of the transmit path 205 receives the one or more up converted signals and provides them to one or more of the power amplifiers (PAs). The transmit output circuit may include a splitter for providing an up converted signal to multiple power amplifiers such that, when the signals are transmitted, they are combined in air, which increases the transmit power. In this manner, one or more of the expensive discrete components (e.g., surface acoustic wave (SAW) filters, off-chip power amplifiers, duplexers, inductors, and/or capacitors) may be omitted.

In addition, or in the alternative, the transmit output circuit may include one or more phase shift circuits to phase shift the one or more up converted signals to facilitate beamforming. The transmit output circuit may further include, or include in the alternative, a polar coordinate driver to facilitate polar coordinate outbound signals.

Regardless of the specific implementation of the transmit output circuit, one or more power amplifiers receives the up-converted signal(s) and amplifies them to produce outbound signal(s).

The receive path 215 is configured to receive an RF receive signal that includes inbound data via the antenna 200 and to demodulate the RF receive signal for extraction of the inbound data via baseband section 220.

The circulator-based duplexer 210 includes a circulator configured to couple the transmit signal from the transmit path 205 to the antenna 200 and to couple the receive signal from the antenna 200 to the receive path 215. In particular, the circulator-based duplexer 210 provides isolation of the transmit signal from the receive path 215.

In an example of duplex operation, the antenna 200 receives one or more inbound signals and provides them to the circulator-based duplexer 210. The circulator-based quadrature duplexer 210 provides the inbound signal(s) to one or more of the low noise amplifiers of the receive path 215, which amplify the inbound signal(s) to produce amplified inbound signal(s). The low noise amplifier(s) provide the amplified inbound signal(s) to a receive (RX) input circuit of the receive path 215, which is a complimentary circuit to the transmit output circuit. For instance, if the transmit output circuit includes a splitter, the receive input circuit includes a combiner.

The receive input circuit provides the inbound signal to a down conversion circuit of the receive path 215, which converts the inbound signal into one or more inbound symbol streams. The down conversion circuit may have a direct conversion topology or a super-heterodyne topology and may include discrete digital components and/or analog circuitry. In addition, the down conversion circuit may receive and process the inbound signals as Cartesian coordinates, as polar coordinates, and/or as hybrid polar-Cartesian coordinates.

The baseband section 220 converts the inbound symbol stream(s) into inbound data (e.g., voice, text, audio, video, graphics, etc.) in accordance with one or more wireless communication standards. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the baseband section 220 converts a single inbound symbol stream into the inbound data for Single Input Single Output (SISO) communications and/or for Multiple Input Single Output (MISO) communications and converts multiple inbound symbol streams into the inbound data for Single Input Multiple Output (SIMO) and Multiple Input Multiple Output (MIMO) communications.

While the circulator-based duplexer 210 provides some isolation, portions of the transmit signal can still be leaked to the receive path 215 by the circulator. In addition, reflections from the antenna caused by impedance mismatch can also cause portions of the transmit signal to be present on the receive path. Even in situations where the wireless transceiver is operating with frequency domain diversity—e.g. separate frequencies are used for transmit and receive, if the signal levels of these portions of the transmit signal are too high on the receive path 215, the input can be swamped, disrupting the reception of the true receive signals.

In operation, the transmit path 205 is configured to not only generate the RF transmit signal to the antenna 200 but also to generate a feedforward signal 225 having at least one adjustable phase. The receive path 215 is likewise configured to receive not only the RF receive signal from the antenna but also the feedforward signal 225. The controller 230 is configured to process feedback 232 from the receive path 215 and to control the at least one adjustable phase via a control signals 234 to cancel portions of the transmit signal on the receive path 215 via the superposition or other combining of the feedforward signal 225 on the receive path 215.

In an embodiment, the controller 230 is further configured to selectively activate and deactivate the generation of the feedforward signal based on mode control data that indicates the state of the wireless transceiver. For example, the controller 230 can selectively deactivate the generation of the feedforward signal when the mode control data indicates a low power transmit mode, a high power receive mode, a time domain diversity mode, a selected modulation mode, a selected coding mode or other conditions where higher isolation or greater cancellation is not required.

Further embodiments including several optional functions and features are described in conjunction with FIGS. 3-16 that follow.

Figure 3:
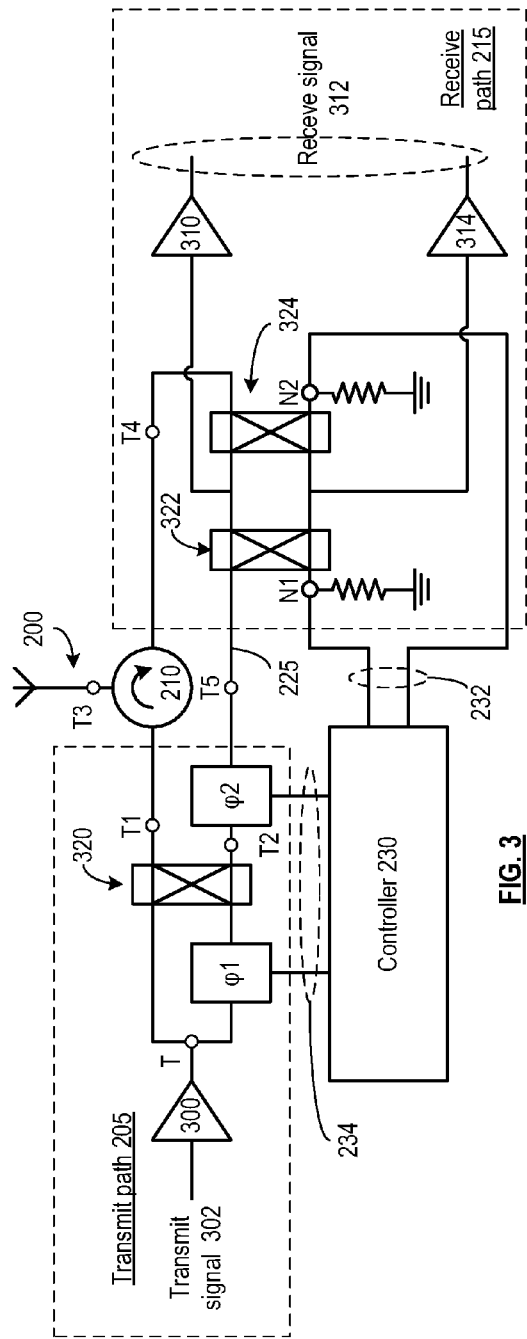
FIG. 3 is a schematic block diagram of an embodiment of a radio front end in accordance with the present disclosure.

FIG. 3 is a schematic block diagram of an embodiment of a radio front end in accordance with the present disclosure. In particular, radio front end is presented that includes a power amplifier 300 of transmit path 205 that amplifies a transmit signal 302, low noise amplifiers 310 and 314 of receive path 215 that generates a receive signal 312, an antenna 200 for transmitting and receiving RF signals and a circulator-based duplexer 210. The transmit path 205 also includes quadrature hybrid 320 and programmable phase adjustments φ1 and φ2 that operate under control of control signals 234 from controller 230 to generate the feedforward signal 225 with an adjustable phase and/or gain. The receive path 215 includes quadrature hybrids 322 and 324, each having a load resistor that operate to generate feedback 232. In this embodiment, the quadrature hybrids 320, 322 and 324 provide 90 degree phase shifts.

For transmission, the circulator-based hybrid 210 couples the transmit signal 302 from the transmit path 205 to the antenna 200. For reception, the circulator-based duplexer couples a received RF signal from the antenna 200 to the receive path 215. The circulator-based duplexer 210 can include a ferrite circulator or other circulator that provides a transmit/receive isolation of about 20 dB. As discussed in conjunction with FIG. 2, the controller 230 is configured to process feedback 232 from the receive path 215 and to control the programmable phase adjustments φ1 and φ2 via a control signals 234 to cancel portions of the transmit signal on the receive path 215. This active cancellation can increase the transmit/receive isolation to 50 dB or more for high power transmit applications—i.e. to cancel substantially all of any residual and/or reflected transmit signals introduced on the receive path 215.

The operation of this radio front end can be further described in conjunction with the following example. The quadrature hybrid 320 operates in conjunction with programmable phase adjustment φ1 to unequally split the transmit signal into two components. Considering the transmit signal 302 to be represented as T, the signal output from the quadrature hybrid 320 to the circulator-based duplexer 210 to be represented by T1 and the signal output from the quadrature hybrid to the programmable phase adjustment φ2 to be represented by T2:

$$T1=(1-\alpha)T$$

$$T2=\alpha T$$

The value of α can be set to correspond to the transmit leakage of the circulator-based duplexer 210. In other words, the gain of the feedforward signal can be set to correspond to the isolation level of the circulator-based duplexer 210.

The transmit signal T3 coupled to the antenna 200 can be represented as $$T3=(1-\alpha)T1=(1-\alpha)^2 T$$

Considering the case where α<<1, $$T3 \approx T$$

In this case, the circulator-based duplexer 210 also introduces a residual transmit signal, represented by T4 on the receive path 215, where $$T4=\alpha T1=\alpha(1-\alpha)T$$

Because α<<1, $$T4 \approx \alpha T$$

The programmable phase adjustment φ2 generates a feedforward signal 225, represented by T5, by shifting the phase of the signal T2 to be $$T5=-\alpha T$$

In this circumstance, the quadrature hybrids 322 and 324 of the receive path 215 operate to cancel or substantially cancel the residual transmit signal on the receive path to improve isolation of the circulator-based duplexer 210.

As previously discussed, the controller 230 operates to set the phase adjustment introduced by the programmable phase adjustments φ1 and φ2 in order to promote cancellation of any portions of the transmit signal introduced on the receive path 215. In particular, setting the phase adjustment introduced by the programmable phase adjustments φ1 and φ2 serves to adjust both the amplitude and phase of feedforward signal 225 used to cancel portions of the transmit signal introduced on the receive path 215 via the circulator-based duplexer 210. In addition to the residual transmit signal caused by transmit leakage of the circulator-based duplexer 210, other causes, such as antenna reflections of the transmit signal on the receive path can be compensated at the same time. In particular, feedback 232 from the receive path 215 can be used to adapt the phase adjustment introduced by the programmable phase adjustments φ1 and φ2 to actual conditions and to promote cancellation of any portion of the transmit signal on the receive path 215—without regard to the cause.

In one mode of operation, the controller 230 includes a feedback receiver that can selectively generate both the amplitude and phases of the signals at nodes N1 and N2. These values can be used by the controller 230 to iteratively calculate the values of the programmable phase adjustments φ1 and φ2.

Consider the following example, where the controller 320 initially measures a received signal strength indication (RSSI) at nodes N1 and N2, represented by $RSSI(N1)_i$ and $RSSI(N2)_i$ respectively. Further, the controller 230 measures the initial phase at nodes N1 and N2, represented by $\theta(N1)_i$ and $\theta(N2)_i$ respectively. The controller 230 can set initial values of φ1 and φ2, represented as $\phi1_i$ and $\phi2_i$, respectively as:

$$\phi1_i = f(RSSI(N1)_i/RSSI(N2)_i)$$

$$\phi2_i = -\theta(N1)_i$$

where f is a function, such as a linear or nonlinear function. Further, the controller 230 can generate updated values of $RSSI(N1)_{i+1}$, $RSSI(N2)_{i+1}$, $\theta(N1)_{i+1}$ and $\theta(N2)_{i+1}$ and update the values of φ1 and φ2, as $$\phi1_{i+1} = \phi1_i - a*f(RSSI(N1)_{i+1}/RSSI(N2)_{i+1})$$

$$\phi2_{i+1} = \phi2_i - b*(\theta(N1)_{i+1} \text{ and } \theta(N2)_{i+1})$$

where a and b are iterative search constants. It should be noted that when the iterative technique converges, i.e. when new values $\phi1_{i+1}$ and $\phi2_{i+1}$ change from prior values $\phi1_i$ and $\phi2_i$ by less than some threshold amount ε, the iterations can be suspended or reduced in periodicity to correspond only to expected or indicated changes in transceiver conditions or performance.

In an embodiment, the controller 230 includes a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing device may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module device includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing device implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

As discussed in conjunction with FIG. 2, the controller 230 can selectively activate/deactivate the active cancellation by, for example, activating/deactivating the measurement and feedforward control functions. One or more switches (not expressly shown) can be included in the feedforward path to either disconnect the feedforward signal 225 from the receive path 215, to connect a load such as a resistive load, to the receive path 215 in place of the feedforward signal 225 or to otherwise decouple the feedforward signal 225 from the receive path 215.

In operation the controller 230 can selectively activate/the active cancellation in any of the following conditions:
  based on transmit output power—e.g. for low TX power levels that may not interfere with the receive path 215;
  based on received signal power (RSSI)—e.g. for high RX power levels where TX power levels may not interfere with the receive path 215;
  based on RX SNR requirement (modulation/coding)—e.g. where coding/constellations schemes are used with low RX SNR requirement;
  based on the use of time domain transmit receive diversity or other periods without simultaneous transmission and reception It should be noted that when active cancellation is not otherwise needed, the controller 230 can periodically activate the active cancellation to determine the values of φ1 and φ2 that can be used to initialize the active cancellation at some later time when the control is activated.

In addition, the active cancellation can be calculated in a factory calibration phase to estimate the values of φ1 and φ2 for calibration of any static impairments/mismatch in the RF front-end. In this fashion, circulator isolation, impedance mismatches, gain/phase/impedance variations of RF components/connections, power amplifier linearity, antenna tuning vs. frequency and/or other static conditions can be determined as a function of channel, frequency band, transmit power, or other transceiver conditions and stored in a memory associated with the controller 230. In normal operation, based on band/channel configuration, the corresponding φ1 and φ2 settings are programmed to compensate for static mismatches in the front-end.

FIG. 4 is a schematic block diagram of another embodiment of a radio front end in accordance with the present disclosure. In particular, a radio front end is shown that includes many similar elements and features described in conjunction with FIGS. 2-3 that are referred to by common reference numerals. In this embodiment, the controller not only controls φ1 and φ2, but also generates one or more control signals 400 to control the antenna tuning unit 240 to compensate for impedance of the antenna 200.

In operation, the antenna tuning unit 240 includes an impedance matching network such as a pi-network, L-network, transformer of other matching that includes one or more adjustable elements such as adjustable capacitors, inductors, resistors or other adjustable impedances. The impedance of the antenna tuning network 240 is controlled by the controller 230 to improve the impedance matching with the antenna. In this fashion, some or all of the reflections of the transmit signal on the receive path 215 can be eliminated at the source rather than relying solely on cancellation.

In one example of operation, the controller 230 uses determined the values of φ1 and φ2 to calculate a value of the antenna impedance, Z, as:

$$Z = g(\phi1, \phi2)$$

where g is a function, such as a pre-stored function or other function that correlates actual antenna impedance as a function of observed values of φ1, φ2 and optionally also a function frequency or frequency band. Based on the current value of Z, the controller 230, based on a look-up table or other control mechanism, determines the value of the control signal(s) 400 to improve the impedance matching produced by antenna tuning unit 240. In addition to the control above, the controller 230 can control the antenna tuning unit 240 based solely on transmit frequency or receive frequency, during time domain diversity for periods of transmit and receive, based on coding and constellation patterns and/or based on other transceiver conditions.

FIG. 5 is a schematic block diagram of another embodiment of a radio front end in accordance with the present disclosure. In particular, a radio front end is shown that includes many similar elements and features described in conjunction with FIGS. 2-4 that are referred to by common reference numerals. In this embodiment, controller 230 not only relies on measurements from nodes N1 and N2 but also on nodes P1 and P2 as well.

In one mode of operation, the controller 230 includes less than a full receiver and relies only on signal power and not on phase measurements to generate the control signals for adjusting φ1 and φ2. For example, the controller 230 includes an RF power detector that is selectively coupled to each of the nodes N1, N2, P1 and P2 via a multiplexer to generate an RSSI measurement. An analog to digital convertor converts the analog RSSI to digital values for each node. The RSSI measurements at P1 and P2 can be used in place of the N1 and N2 phase measurements to iteratively adjusting φ1 and φ2. For example $$\phi1_i = f1(RSSI(N1)_{i+1}/RSSI(N2)_{i+1})$$

$$\phi2_i = f2(RSSI(P1)_{i+1}/RSSI(P2)_{i+1})$$

and $$\phi1_{i+1} = \phi1_i - a1 * f1(RSSI(N1)_{i+1}/RSSI(N2)_{i+1})$$

$$\phi2_{i+1} = \phi2_i - a2 * f2(RSSI(P1)_{i+1}/RSSI(P2)_{i+1})$$

where f1 and f2 are functions such as linear or non-linear functions and a1 and a2 are iterative search constants.

Figure 6:
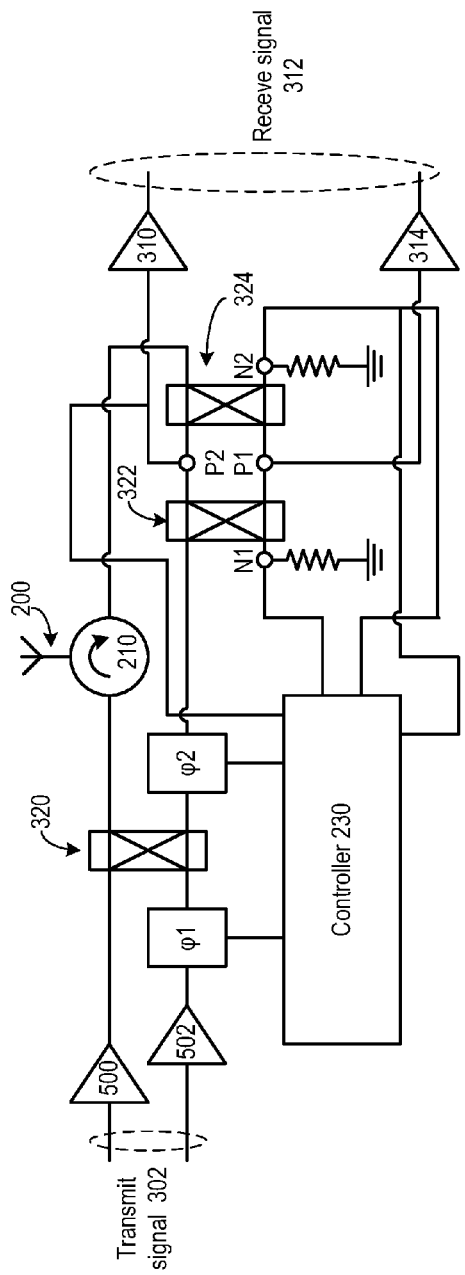
FIG. 6 is a schematic block diagram of another embodiment of a radio front end in accordance with the present disclosure.

FIG. 6 is a schematic block diagram of another embodiment of a radio front end in accordance with the present disclosure. In particular, a radio front end is shown that includes many similar elements and features described in conjunction with FIGS. 2-5 that are referred to by common reference numerals. In this embodiment, in-phase power amplifier 500 and quadrature-phase power amplifier 502 are used in place of PA 300.

Figure 7:
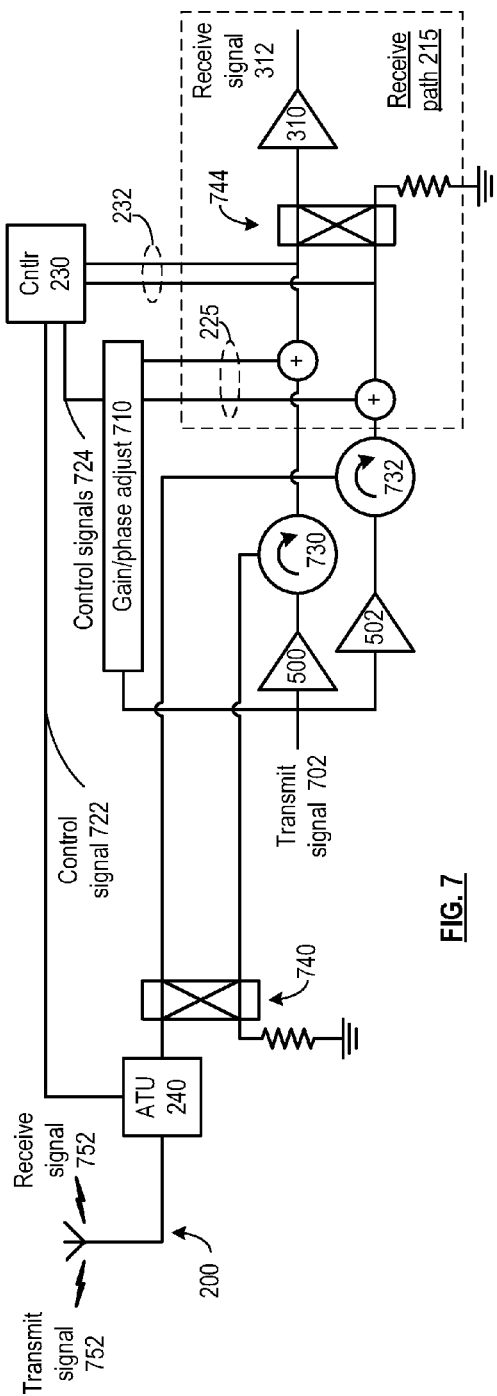
FIG. 7 is a schematic block diagram of another embodiment of a radio front end in accordance with the present disclosure.

FIG. 7 is a schematic block diagram of another embodiment of a radio front end in accordance with the present disclosure. In particular, a radio front end is shown that includes many similar elements and features described in conjunction with FIGS. 2-6 that are referred to by common reference numerals. In this configuration, I and Q power amplifiers 500 and 502 amplify a transmit signal 702. I and Q circulators 730 and 732 couple the transmit signal to antenna 200 via quadrature hybrid 740 and antenna tuning unit 240. Quadrature hybrid 744 and low noise amplifier 310 are used in place of I and Q low noise amplifiers 310 and 314.

In this embodiment, the transmit signal 702 is adjusted in gain and/or phase by gain/phase adjust 710, based on control signals 724, to generate I and Q feedforward signals 225 that are summed with the output of the I and Q circulators 730 and 732 along the receive path 215. Controller 230 gathers feedback 232 from the inputs of quadrature hybrid 744 and based on a look-up table or other control mechanism, generates control signals 724 to control the gain and phase of these I and Q feedforward signals 225. Controller 230 also generates control signal 722 to control the antenna tuning unit 240 to reduce the antenna mismatch.

FIG. 8 is a schematic block diagram of another embodiment of a radio front end in accordance with the present disclosure. In particular, a radio front end is shown that includes many similar elements and features described in conjunction with FIGS. 2-7 that are referred to by common reference numerals. In this embodiment, a single phase adjustment φ1 is employed to adjust the phase, but not the gain, of the feedforward signal 225.

FIG. 9 is a schematic block diagram of another embodiment of a radio front end in accordance with the present disclosure. In particular, a radio front end is shown that includes many similar elements and features described in conjunction with FIGS. 2-8 that are referred to by common reference numerals. In this embodiment, quadrature hybrid 744 and low noise amplifier 310 are used in place of I and Q low noise amplifiers 310 and 314.

FIG. 10 is a schematic block diagram of another embodiment of a radio front end in accordance with the present disclosure. In particular, a radio front end is shown that includes many similar elements and features described in conjunction with FIGS. 2-9 that are referred to by common reference numerals. In this embodiment, a single low noise amplifier 310 is used in place of I and Q low noise amplifiers 310 and 314. Feedback 232 from the receive path 215 used by the controller 230 is measured at a single point at the input to the low noise amplifier (LNA) 310.

FIG. 11 is a schematic block diagram of an embodiment of a quadrature hybrid in accordance with the present disclosure. A quadrature hybrid, such as quadrature hybrid 320, 322, 324 or 744 is shown as implemented via a balun. In this embodiment, a single-ended 90° hybrid circuit includes a transformer 1100 having a first winding 1102 and a second winding 1104 with winding polarities as shown. The 90° hybrid circuit has two inputs, IN 1110 and ISO 1112 and two outputs, in-phase output 1120 and quadrature-phase output 1122. When a signal is inputted to the IN port 1110 and the ISO port 1112 is properly terminated (which can be done in variety of ways—such as via a resistor, as shown, or other load), the 90° hybrid circuit outputs I and Q signals 1120 and 1122 of the inputted signal (e.g., a zero degree phase shifted representation of the signal and a ninety degree phase shifted representation of the signal).

FIG. 12 is a schematic block diagram of another embodiment of a quadrature hybrid in accordance with the present disclosure. A quadrature hybrid, such as quadrature hybrid 320, 322, 324 or 744 is shown that operates via differential signaling. The differential 90° hybrid circuit includes two transformers 1200 and 1202 and a resistor 1204. The 90° hybrid circuit has two differential inputs IN+ 1210 and IN− 1214 and two differential outputs, in-phase output 1220 and quadrature-phase output 1222. A resistor 1204 is coupled between the ISO differential inputs. Each of the transformers 1200 and 1202 includes two windings with the polarity as shown.

Figure 13:
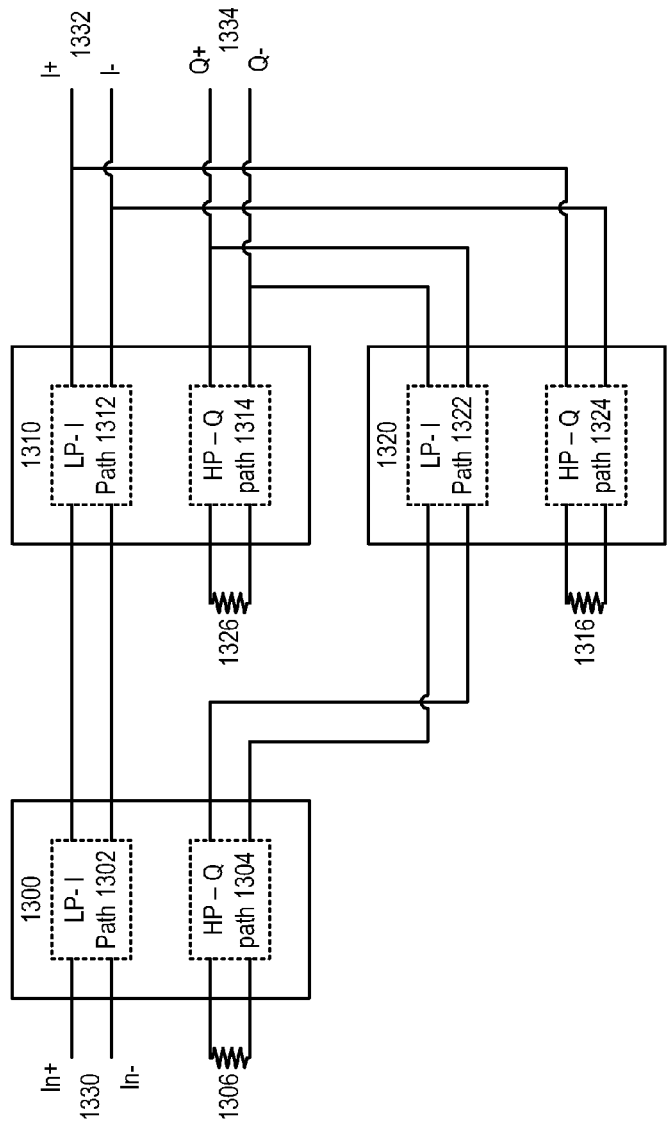
FIG. 13 is a schematic block diagram of another embodiment of a quadrature hybrid in accordance with the present disclosure.

FIG. 13 is a schematic block diagram of another embodiment of a quadrature hybrid in accordance with the present disclosure. A quadrature hybrid, such as quadrature 320, 322, 324 or 744 is shown that includes a plurality of low-pass filters and a plurality of high-pass filters. In this embodiment, three 90° hybrid circuits 1300, 1310 and 1320 and three resistors 1306, 1316 and 1326 are configured as shown to provide I and Q outputs 1332 and 1334, from input 1330 for broadband applications.

Consider a frequency band between F-low and F-high. The low-pass in-phase paths 1302, 1312 and 1322 and the high-pass Q-phase paths 1304, 1314 and 1324 have the same cut-off frequency. The phase differential between the high-pass and low-pass paths of each hybrid is 90 degrees. The in-phase output 1332 can be represented as the product of the two low-pass paths 1302 and 1312 summed with the product of two high-pass paths 1304 and 1324 and is therefore a flat response over the entire frequency band. The Q-phase output 1334 is can be represented the product of the low-pass path 1302 and high-pass path 1314 summed with the product of high-pass path 1304 and low-pass path 1322 and is therefore also a flat response over the entire frequency band.

Figure 14:
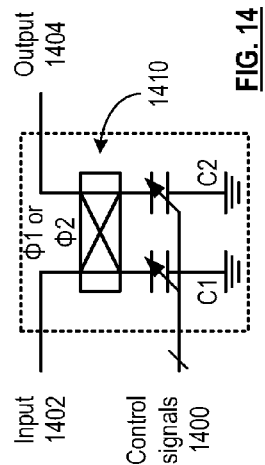
FIG. 14 is a schematic block diagram of an embodiment of an adjustable phase in accordance with the present disclosure.

FIG. 14 is a schematic block diagram of an embodiment of an adjustable phase in accordance with the present disclosure. In particular, an adjustable phase $\phi 1$ or $\phi 2$ is presented. A quadrature hybrid 1410 is used in conjunction with two variable capacitors C1 and C2 that are controlled via control signals 1400.

In operation, variations in voltage of the control signals 1400 individually control the capacitance of the capacitors C1 and C2 to adjust the phase of the output 1404 with respect to the input 1402. While a particular adjustable phase $\phi 1$ or $\phi 2$ is shown as implemented via a quadrature hybrid 1410, other circuit configurations with adjustable inductors or other adjustable impedances are likewise possible.

Figure 15:
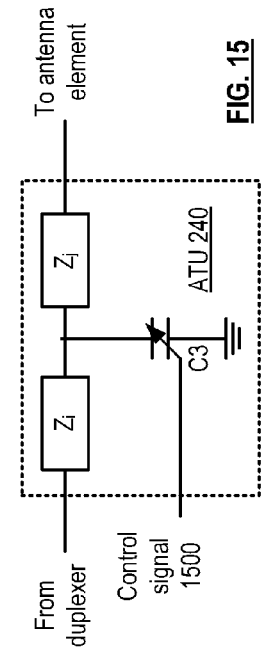
FIG. 15 is a schematic block diagram of an embodiment of an antenna tuning unit in accordance with the present disclosure.

FIG. 15 is a schematic block diagram of an embodiment of an antenna tuning unit in accordance with the present disclosure. An embodiment of antenna tuning unit 240 is shown as a pi-network configuration with impedances Zi and Zj and a variable capacitor C3 that is controlled based on control signal 1500.

In operation, variations in voltage of the control signal 1500 controls the capacitance of the capacitor C3 to adjust the impedance of the antenna tuning unit to provide matching between the antenna element and the duplexer. While a particular antenna tuning unit 240 is shown, other circuits could likewise be employed. In particular, other circuit configurations such as L-network configurations, and circuits with adjustable resistors or inductors or other adjustable impedances, and further with multiple adjustable impedances are likewise possible.

FIG. 16 is a flow diagram of another embodiment of a method in accordance with the present disclosure. In particular a method is presented for use with one or more functions and features described in conjunction with FIGS. 1-15. Step 1600 includes generating a radio frequency (RF) transmit signal for transmission via an antenna. Step 1602 includes generating a feedforward signal having at least one adjustable phase. Step 1604 includes receiving an RF receive signal from the antenna and the feedforward signal via a receive path. Step 1606 includes isolating the transmit signal from the receive path via a circulator configured to couple the transmit signal from the transmit path to the antenna and to couple the receive signal from the antenna to the receive path. Step 1608 includes processing feedback from the receive path to control the at least one adjustable phase to cancel portions of the transmit signal on the receive path.

In an embodiment, the feedback from the receive path includes a plurality of signal strength measurements and/or a plurality of phase measurements. The generation of the feedforward signal can be selectively deactivated based on mode control data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/ or processing unit executes, hard coded and/or operational instructions corresponding to at least some of the steps and/or functions illustrated in one or more of the Figures. Such a memory device or memory element can be included in an article of manufacture.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present disclosure is used herein to illustrate the present disclosure, an aspect thereof, a feature thereof, a concept thereof, and/or an example thereof. A physical embodiment of an apparatus, an article of manufacture, a machine, and/or of a process that embodies the present disclosure may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a Figure of any of the Figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present disclosure. A module includes a processing module, a functional block, hardware, and/or memory that stores operational instructions for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present disclosure have been expressly described herein, other combinations of these features and functions are likewise possible. The present disclosure is not limited by the particular examples disclosed herein and expressly incorporates these other combinations.

What is claimed is:

1. A wireless transceiver comprising:
a transmit path configured to generate a radio frequency (RF) transmit signal for transmission via an antenna, the transmit path generating a feedforward signal having at least one adjustable phase;
a receive path configured to receive an RF receive signal via the antenna and the feedforward signal;
a circulator-based duplexer including a circulator configured to couple the transmit signal from the transmit path to the antenna and to couple the RF receive signal from the antenna to the receive path; and
a controller configured to process feedback from the receive path and to control the at least one adjustable phase to cancel portions of the transmit signal on the receive path, and further configured to selectively deactivate the feedforward signal based on mode control data.

2. The wireless transceiver of claim 1 wherein the transmit path includes a splitter that generates the feedforward signal at a gain that corresponds to an isolation level of the circulator-based duplexer.

3. The wireless transceiver of claim 1 wherein the at least one adjustable phase includes a plurality of adjustable phases.

4. The wireless transceiver of claim 3 wherein the receive path includes a plurality of quadrature hybrids and the feedback from the receive path includes a plurality of signal strength measurements.

5. The wireless transceiver of claim 4 wherein the feedback from the receive path further includes a plurality of phase measurements.

6. The wireless transceiver of claim 1 wherein the controller selectively deactivates the feedforward signal when the mode control data indicates a low power transmit mode.

7. The wireless transceiver of claim 1 wherein the controller selectively deactivates the feedforward signal when the mode control data indicates a high power receive mode.

8. The wireless transceiver of claim 1 wherein the controller selectively deactivates the feedforward signal based on at least one of: a selected modulation mode, and a selected coding mode.

9. The wireless transceiver of claim 1 wherein the controller processes the feedback from the receive path and to iteratively control the at least one adjustable phase.

10. A wireless transceiver comprising:
a transmit path configured to generate a radio frequency (RF) transmit signal for transmission via an antenna that includes a programmable antenna tuning unit, the transmit path generating a feedforward signal having at least one adjustable phase;
a receive path configured to receive an RF receive signal via the antenna and the feedforward signal;
a circulator-based duplexer including a circulator configured to couple the transmit signal from the transmit path to the antenna and to couple the RF receive signal from the antenna to the receive path; and
a controller configured to process feedback from the receive path, to control the at least one adjustable phase to cancel portions of the transmit signal on the receive path, to selectively deactivate the feedforward signal based on mode control data and further to control the programmable antenna tuning unit to compensate for impedance of the antenna.

11. The wireless transceiver of claim 10 wherein the transmit path includes a splitter that generates the feedforward signal at a gain that corresponds to an isolation level of the circulator-based duplexer.

12. The wireless transceiver of claim 10 wherein the at least one adjustable phase includes a plurality of adjustable phases.

13. The wireless transceiver of claim 12 wherein the receive path includes a plurality of quadrature hybrids and the feedback from the receive path includes a plurality of signal strength measurements.

14. The wireless transceiver of claim 13 wherein the feedback from the receive path further includes a plurality of phase measurements.

15. A method comprising:
   generating a radio frequency (RF) transmit signal for transmission via an antenna;
   generating a feedforward signal having at least one adjustable phase, wherein the generation of the feedforward signal is selectively deactivated based on mode control data;
   receiving an RF receive signal from the antenna and the feedforward signal via a receive path;
   isolating the transmit signal from the receive path via a circulator configured to couple the transmit signal to the antenna and to couple the RF receive signal from the antenna to the receive path; and
   processing feedback from the receive path to control the at least one adjustable phase to cancel portions of the transmit signal on the receive path.

16. The method of claim 15 wherein the feedback from the receive path includes a plurality of signal strength measurements.

17. The method of claim 16 wherein the feedback from the receive path further includes a plurality of phase measurements.

18. The method of claim 15 wherein the feedforward signal is selectively deactivated when the mode control data indicates a low power transmit mode.

19. The method of claim 15 wherein the feedforward signal is selectively deactivated when the mode control data indicates a high power receive mode.

20. The method of claim 15 wherein the feedforward signal is selectively deactivated based on at least one of: a selected modulation mode, and a selected coding mode.

* * * * *